UNITED STATES PATENT OFFICE.

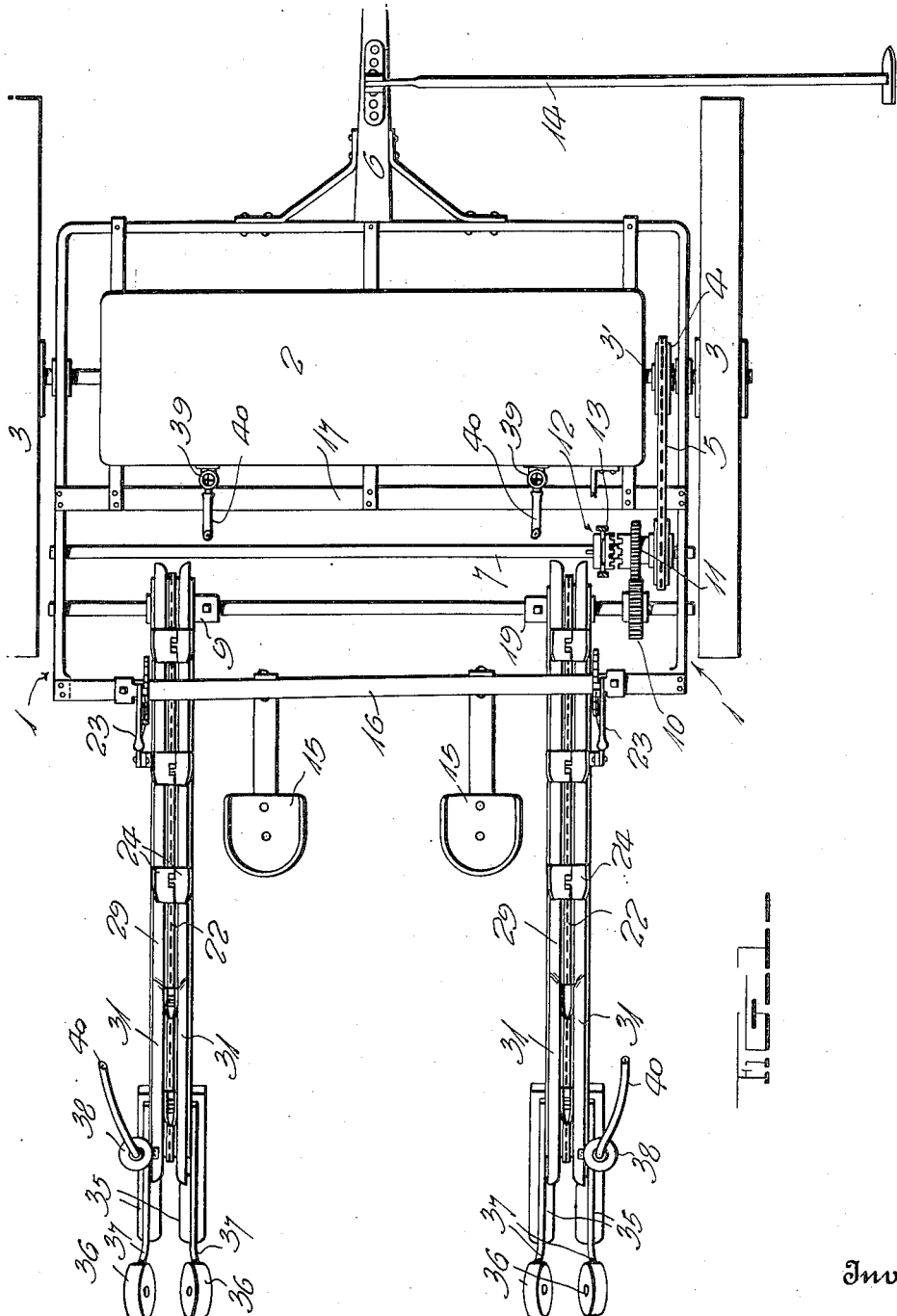

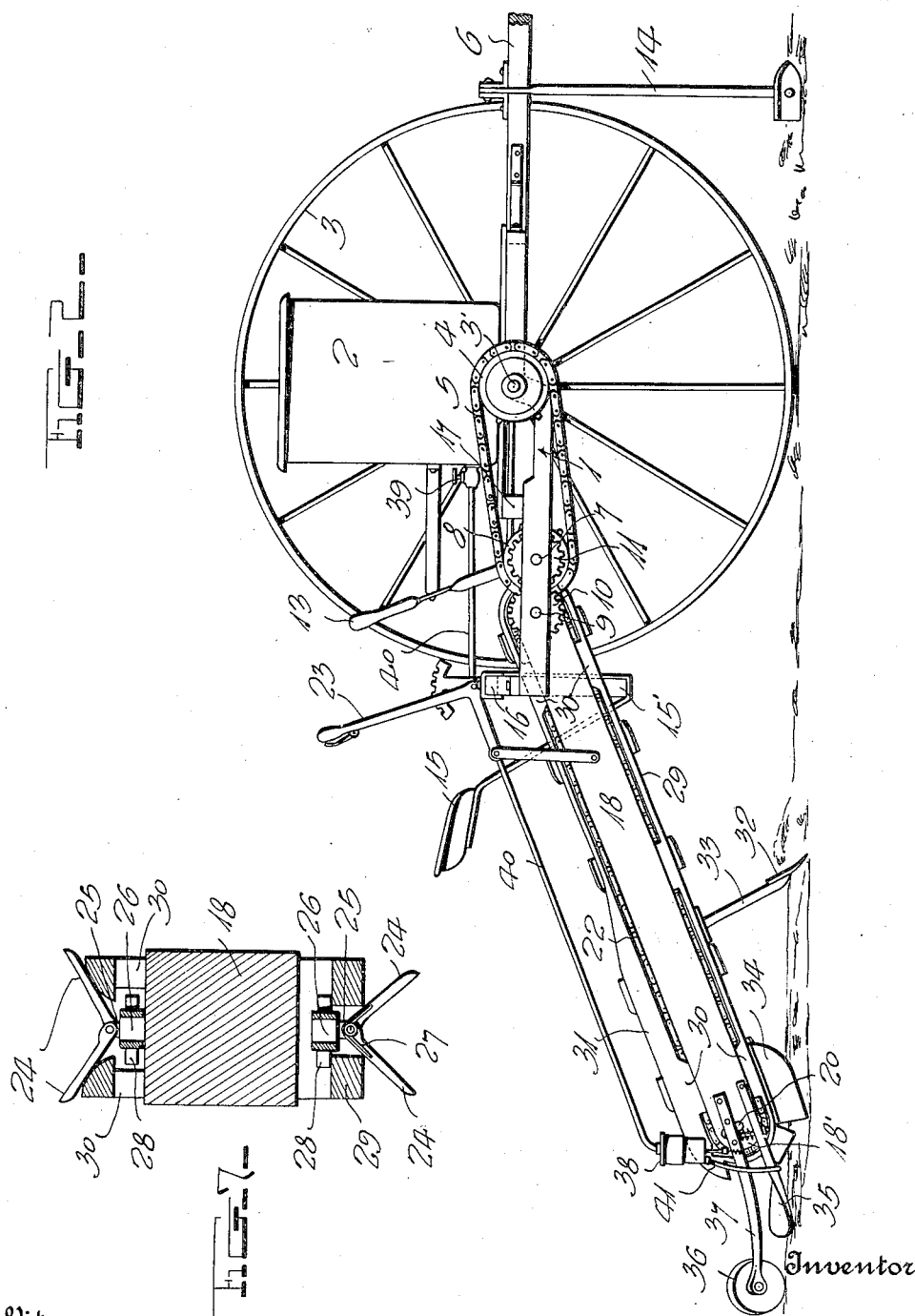

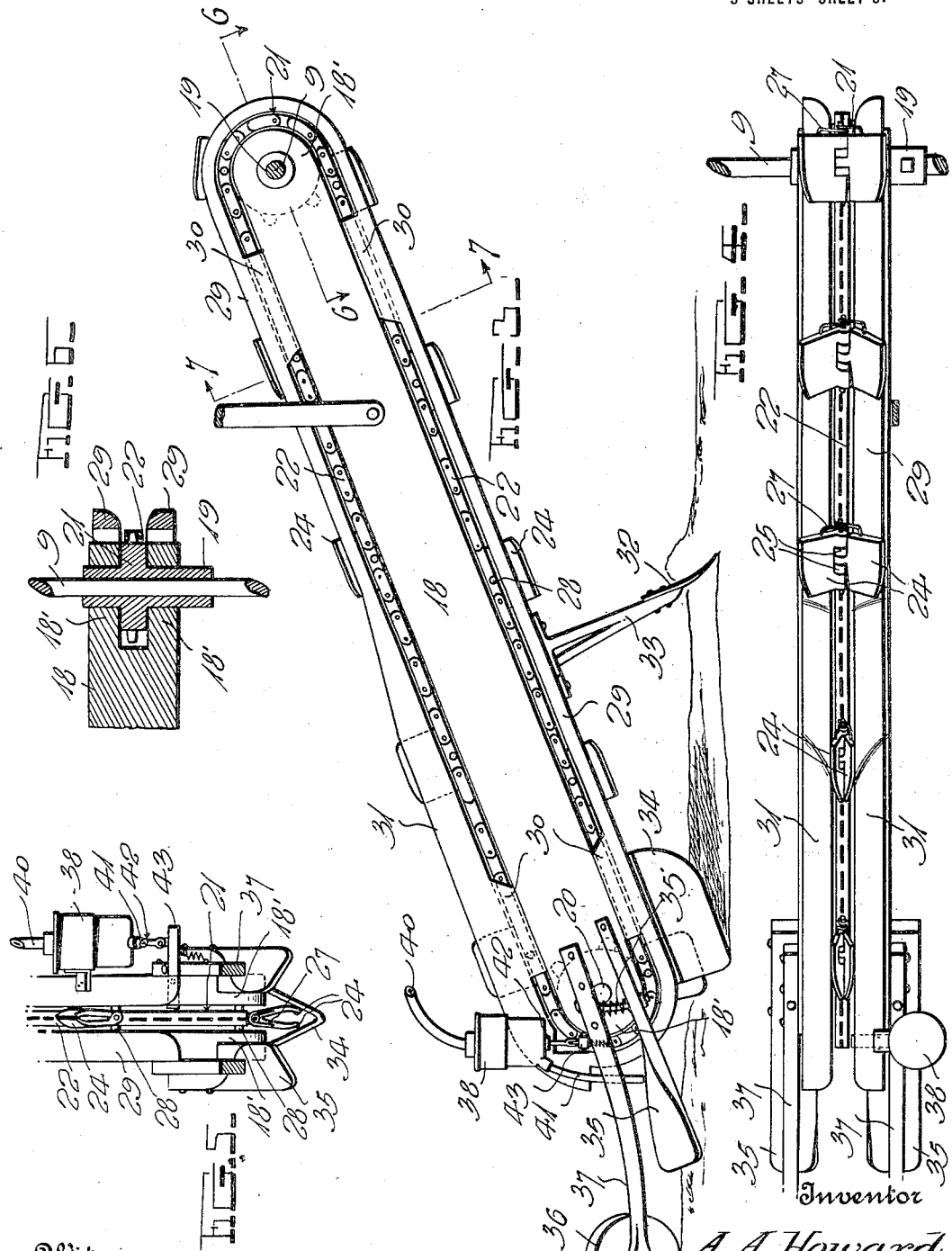

ALFRED A. HOWARD, OF WADDY, KENTUCKY.

PLANTER.

1,398,190.  Specification of Letters Patent.  Patented Nov. 22, 1921.

Application filed January 13, 1921. Serial No. 436,982.

*To all whom it may concern:*

Be it known that I, ALFRED A. HOWARD, a citizen of the United States, residing at Waddy, in the county of Shelby and State of Kentucky, have invented certain new and useful Improvements in Planters; and I do declare the following to be a full, clear, and exact description of the invention, such as will enable others skilled in the art to which it appertains to make and use the same.

This invention relates to an improved planter and one object of the invention is to provide a planter having improved means for conveying the plants and depositing the same in a furrow and to further provide improved means for supplying water to the newly placed plants, means also being provided for filling in a furrow and pressing the earth about the newly placed plants.

Another object of the invention is to so construct this planter that the jaws which engage the plants may be normally held in an open position by a spring and moved to a closed or plant holding position by cam elements formed upon a track bar along which will move an endless conveyer chain having the plant gripping jaws connected therewith.

Another object of the invention is to so construct the track bar that side pins extending from the links carrying the plant gripping jaws may travel in grooves formed in the track bar and hold the endless chain against transverse movement, the side pins further serving to engage a trip for releasing a supply of water for each plant when placed in the ground.

Another object of the invention is to so construct the track bar that scraping blades or arms may be connected with the rear portion thereof for engaging the ground and filling in the furrow, rollers being mounted to the rear of the track bar for engaging the earth filled in by the scraping blades and pressing the same into the furrow about the newly placed plants.

Another object of the invention is to so construct the track bar that the plow and furrow opener may be connected with the same without interfering with proper movement and operation of the endless chain and plant gripping jaws.

Another object of the invention is to so construct this planter that the machine may be provided with a plurality of track bars movable vertically into and out of an operative position and adjustable toward and away from each other according to the distance it is desired to leave between the rows.

Another object of the invention is to so construct this machine that only one operation is required to supply plants to the jaws of a single track bar thus permitting a single operator to set the plants in one row instead of requiring more than one operation for a single row.

Another object of the invention is to so construct this machine that a main water reservoir may be carried by the frame and an auxiliary reservoir carried by the track bar, the auxiliary reservoir being filled from the main reservoir and the water fed out of the auxiliary reservoir by the trip mechanism as the plants are placed in the furrow.

Another object of the invention is to so construct this planter that the endless chain may be driven from one of the supporting wheels of the frame or carriage and to further so construct the machine that the machine may be moved without the planting mechanism operated if so desired.

Another object of the invention is to so construct this machine that it will be strong and durable, comparatively simple in construction and very easy to operate and not liable to readily get out of order.

This invention is illustrated in the accompanying drawings, wherein:

Figure 1 is a top plan view of the planter.

Fig. 2 is a side elevation of the planter.

Fig. 3 is an enlarged side elevation of one of the planting bars.

Fig. 4 is a top plan view of the planter bar.

Fig. 5 is a fragmentary view showing the lower portion of the planter bar.

Fig. 6 is a section taken along the line 6—6 of Fig. 3.

Fig. 7 is a section taken along the line 7—7 of Fig. 3.

This improved planter is provided with a frame 1 which carries a main water reservoir 2 and is provided with supporting wheels 3, the axle 3' carrying a sprocket wheel 4 about which passes a sprocket chain 5 so that when the machine is drawn forwardly by the draft animals which will be connected with the tongue 6, rotary movement can be transmitted to the shaft 7 through the medium of the sprocket chain 5 which passes about the sprocket wheel 4 and about a sprocket wheel 8 mounted upon the shaft 7. A shaft 9 is carried by the frame to the rear of the shaft 7 and carries a gear or pinion 10 which meshes with a gear or pinion 11 carried by the shaft 7 so that this shaft 9 will be rotated from the shaft 7. The gear wheel 11 is provided with a clutch 12 and an actuating lever 13 is provided for this clutch so that the driver can release the gear wheel from the shaft 7 when it is not desired to have the planting mechanism operated and at the same time permit the machine to be moved from one place to another. A marker bar 14 is provided to engage the ground and thus mark the row which is to be next planted and thus have the rows extend parallel.

This machine has been constructed to plant two rows at once and is provided with duplicate planting mechanism. It is to be understood that as many planting mechanisms may be provided as desired according to the size of the machine and the number of rows it is desired to plant at one time. In this machine, a driver's seat 15 is provided adjacent each of the planting mechanisms and a foot rest 15' is suspended from the cross bar 16 so that the driver can support his feet. The cross bar 16 and the forward cross bar 17 will further provide a support upon which boxes containing the plants which are to be planted may be placed. Each of the planting mechanisms is provided with a track bar 18 having end extensions 18' which are positioned in spaced relation and carry short shafts or sleeves 19 and 20 at their upper and lower ends upon which will be mounted sprocket wheels 21 to carry an endless sprocket chain 22. The upper sleeve or shaft 19 is movable longitudinally of the shaft 9 but is held against rotation thereon so that when the shaft 9 is rotated the sprocket wheels carried by the sleeve 19 will rotate and thus the endless chain 22 moved longitudinally of the track bar. A latch lever 23 for each track bar is mounted upon the rear shaft 16 and connected with the track bar so that the track bar may be drawn up to an inoperative position and thus the machine permitted to be turned at the end of a row without the planting mechanism dragging upon the ground. This will further permit the machine to be moved from one field to another without having the planting mechanism drag upon the ground and will also permit one of the planting mechanisms to be drawn upwardly to an inoperative position thus permitting a single row to be planted if desired or found necessary.

At points throughout its length the endless chain 22 has been provided with plant carrying elements which receive the plants and deposit them in the furrow. Each of these plant receiving elements is provided with plant gripping jaws 24 which are pivotally connected with the hinge ears 25 of the links 26. A spring 27 has been provided with its arms engaging the two jaws and serving to normally retain the jaws in an open position thus permitting the plants to be placed between the gripping jaws with the jaws in an open position. Pins 28 extend from the sides of the links 26 and provide guiding and supporting means which will prevent sagging of the lower flight of this endless chain 22. Each side of the track bar 18 carries a binding strip 29 which extends entirely about the track bar and is held in spaced relation to the same by the lugs 30 thus providing space between the track bar and the binding to receive the pins 28. The binding strips have their upper faces beveled and converging inwardly and downwardly so that the jaws will spread somewhat when reaching the upper face of the track bar. The jaws will then extend as shown upon the upper portion of Fig. 7 and an operator may readily place the plants between these jaws with the root end portions of the plants extending beyond the lower ends of the jaws. Since the jaws are spread open but at the same time converged inwardly and downwardly, a plant placed between them but dropping upon one of the jaws will have a tendency to roll to the intersection of the jaws and there will be no danger of the plants slipping transversely of the track bar 18 and dropping upon the ground. At the rear or free end of the track bar, there have been provided shoulders 31 which extend longitudinally of the track bar and are provided with sloping forward faces and have their rear ends cut square. By providing the sloping forward faces, the shoulders will provide cams for engaging the ends of the jaws and causing the jaws to move to a closed position by passing between these shoulders. Therefore the jaws will grip the plants and as the jaws move downwardly at the lower or rear end of the track bar, the plants which are held by these jaws will be placed in the furrow in an upright position. Upon reaching the ends of the shoulders, the jaws will be released and permitted to move to an open position so that the plants will be released and left standing in the furrow. The jaws will not however close tightly and therefore there will be no danger of the plant stems becoming crushed while being placed in the furrow.

The track bar carries a plow blade 32 for breaking up the ground as the machine moves across the field and this plow blade is connected with the track bar by means of arms 33 which are connected with the binding strips thus providing space between the arms to permit the plant carriers to pass upwardly along the underface of the track bar. A furrow opener 34 is also carried by the track bar to the rear of the plow and is formed from heavy sheet metal or in the form of a casting. This furrow opener is elongated and is V-shaped in cross section and has its side walls extending for connection with the bindings of the track bar. The jaws of the carriers can therefore pass through this furrow opener between the walls thereof but will of course have to close while passing through. By having the jaws bent to converge toward each other at one end as shown in Fig. 4, the jaws may be moved into the plant-gripping position very easily due to the fact that these bent end portions will be easily engaged by the cams 31. The bending of the end portions of the jaws also permits of the jaws being moved to a closed position in order to pass through the furrow opener 34 since these bent end portions provide cam faces which will engage the diverging walls of this furrow opener. The ends of the jaws will not catch upon the ends of the diverging walls of the furrow opener but will slidably engage the walls of this furrow opener and the jaws will be moved to the position shown at the lower end of Fig. 5 and retained in this position while they are passing through the furrow opener. Scraping blades 35 are pivotally secured to the sides of the track bar and extend rearwardly of the track bar and are cut to engage the earth and move the earth back into the furrow about the plants which have been left standing in the furrow by the plant carriers, springs 35' being provided to yieldably retain the blades in the proper position. It is desired to have this earth packed down close about the plants and therefore rollers 36 which are carried by arms 37 are provided to the rear of the scraping blades 35. These rollers are positioned at an incline so that they will properly engage the earth scraped back into the furrow by the blades 35 and press this earth toward the plants. When the plants are placed in the furrow, it is desired to have water supplied to the plants to make them grow and take root quickly and further permit the earth to be closely packed about the roots and adhere to the same. Therefore, each of the track bars is provided with an auxiliary water receptacle 38 which is of a telescopic construction so that its capacity may be varied and is connected with the valve controlled outlet 39 of the main reservoir 2 by a hose or other flexible connection 40. The auxiliary reservoir is provided with an outlet pipe 41 which leads down to a point where the water passing through the same can be discharged into the furrow at the point where the plant is deposited by the plant carrier. This outlet pipe 41 is provided with a valve 42 which is normally closed and provided with a lever handle 43 by means of which the valve may be moved to an open position, the valve returning of itself to a closed position when the lever is released. This lever handle extends for engagement by one of the side pins 28 and it will thus be seen that as the plant carrier moves and reaches the point of releasing the plant to leave it standing in the furrow, the pin will engage the lever handle and will move the valve to an open position thus permitting water to flow into the furrow. The lever handle will then be released and the valve will be returned to the closed position to cut off the flow of water to the outlet pipe. It will thus be seen that when in use, the machine may be driven across a field and the plants placed in the furrow which has been formed by the plow and furrow opener, the plants watered, and the furrow then filled in by the scraping blades and the earth compressed about the plants by the compressing rollers. It will be further noted that with this machine a single operator may supply the plants for a furrow instead of requiring two or more operators for one furrow.

I claim:

1. A planter comprising a frame, an inclined track bar carried by said frame, binding strips extending about the side portions of the upper and lower faces of the track bar and having cam elements at one end of the track bar, a furrow opener carried by said track bar, an endless carrier carried by said track bar and moving longitudinally thereof between the binding strips, normally inoperative plant gripping means carried by the carrier and moved to an operative position by said cam elements, and furrow filling means carried by said track bar.

2. A planter comprising a frame, an inclined track bar carried thereby and having longitudinally extending spaced cam elements extending upwardly from its lower end along its upper face, an endless carrier carried by said track bar and moving longitudinally thereof between the cam elements, a furrow opener carried by the track bar, and having diverging side walls, and plant engaging jaws movably carried by the endless carrier and yieldably held in an open position, the jaws having movement into and out of a gripping position and moved into a gripping position by the cam elements, and returning to an open position upon moving out of engagement with the cam elements, the jaws at one end being bent to extend toward each other and provide cam portions for engaging the walls of the furrow opener and cause the jaws to move to a closed position and remain in a closed position during passage through the furrow opener.

3. A planter comprising a frame, an inclined track bar carried thereby, binding strips positioned about the side portions of the upper and lower faces of the track bar, lugs holding the binding strips in spaced relation to the track bar, sprocket wheels rotatably mounted at the ends of the track bar, an endless chain passing about the sprocket wheels, pins extending from certain of the links of the chain and positioned between the track bar and binding strips, to support the lower flights of the endless chain, plant gripping jaws hingedly connected with the links having the pins extending therefrom, resilient means yieldably holding the jaws in an open position, cam elements carried by the binding strips and extending longitudinally thereof from a point adjacent the lower end of the track bar to the lower end, the jaws passing out of engagement with the cam elements upon coming to an upright position, furrow opening means carried by said track bar, a water receptacle having an outlet pipe provided with a control valve normally closed and moved to an open position by said pins, and means for filling earth into a furrow about the plants positioned therein.

4. A planter comprising a carriage, an inclined track bar pivotally mounted for swinging movement into and out of an operative position, an endless carrier carried by and moving longitudinally of the track bar, cams carried by the track bar, a furrow opener carried by and positioned beneath the lower end of the track bar and V-shaped in cross section, plant gripping jaws carried by the endless carrier and moved to a plant gripping position upon engagement with said cam elements and moving through the furrow opener between the side walls thereof after leaving the cam elements, the jaws extending toward each other at one end to provide cam faces for engaging the walls of the V-shaped furrow opener whereby the jaws may be moved toward each other upon engaging the walls of the furrow opener, blades pivotally carried by the track bar and extending rearwardly thereof for moving earth into the furrow about plants placed therein, resilient means for yieldably holding the blades in engagement with the ground, and rollers carried by the track bar and positioned to the rear of said scraping blades for pressing earth about plants positioned in the furrow.

In testimony whereof I have hereunto set my hand.

ALFRED A. HOWARD.